US009292031B2

(12) United States Patent
Beyerle et al.

(10) Patent No.: US 9,292,031 B2
(45) Date of Patent: Mar. 22, 2016

(54) HOUSEHOLD ENERGY MANAGEMENT SYSTEM

(71) Applicant: GENERAL ELECTRIC COMPANY, Schenectady, NY (US)

(72) Inventors: Michael Thomas Beyerle, Pewee Valley, KY (US); Jay Andrew Broniak, Louisville, KY (US); Joseph Mark Brian, Louisville, KY (US); David C Bingham, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/973,463

(22) Filed: Aug. 22, 2013

(65) Prior Publication Data
US 2013/0345891 A1 Dec. 26, 2013

Related U.S. Application Data

(62) Division of application No. 13/042,550, filed on Mar. 8, 2011, now abandoned.

(51) Int. Cl.
| | |
|---|---|
| *G05F 5/00* | (2006.01) |
| *G06F 1/32* | (2006.01) |
| *G06Q 50/06* | (2012.01) |
| *H02J 3/12* | (2006.01) |
| *H02J 3/14* | (2006.01) |

(52) U.S. Cl.
CPC ............... *G05F 5/00* (2013.01); *G06F 1/3203* (2013.01); *H02J 3/12* (2013.01); *H02J 3/14* (2013.01); *G06Q 50/06* (2013.01); *H02J 2003/143* (2013.01); *Y02B 70/3225* (2013.01); *Y04S 20/222* (2013.01); *Y04S 20/227* (2013.01)

(58) Field of Classification Search
CPC ............. G05F 5/00; G06Q 50/06; H02J 3/12; H02J 3/14; H02J 2003/143; Y02B 70/3225; Y04S 20/222; Y04S 20/227; G06F 1/3203
USPC ................. 700/9, 11, 28, 286, 291, 295, 297; 702/64
See application file for complete search history.

(56) References Cited

U.S. PATENT DOCUMENTS

| | | |
|---|---|---|
| 3,652,838 A | 3/1972 | Dillon et al. |
| 4,247,786 A | 1/1981 | Hedges |
| 4,612,619 A | 9/1986 | Culp |

(Continued)

FOREIGN PATENT DOCUMENTS

EP        2544324 A1 *  1/2013

*Primary Examiner* — Carlos Ortiz Rodriguez
*Assistant Examiner* — Jennifer L Norton
(74) *Attorney, Agent, or Firm* — Dority & Manning, P.A.

(57) ABSTRACT

A household energy management system for managing multiple appliances is provided. In an embodiment the system comprises a controller for managing power consumption of multiple appliances within a household; a utility meter for measuring an amount of energy usage to a household, the utility meter communicating to the controller a demand limit; and a user interface through which a user can enter a parameter of energy usage. The controller establishes a demand limit. A communication network connects the controller to the utility meter and/or to a demand server. The controller controls or operates the multiple appliances based cm communications from at least one of the utility meter, the user interface, and a demand server, such that the energy usage does not exceed the established demand limit.

9 Claims, 1 Drawing Sheet

(56) References Cited

U.S. PATENT DOCUMENTS

| | | | |
|---|---|---|---|
| 4,819,180 A | 4/1989 | Hedman et al. | |
| 5,414,640 A | 5/1995 | Seem | |
| 5,684,710 A | 11/1997 | Ehlers et al. | |
| 6,037,758 A * | 3/2000 | Perez | 323/268 |
| 6,519,509 B1 | 2/2003 | Nierlich et al. | |
| 6,817,195 B2 | 11/2004 | Rafalovich et al. | |
| 6,862,498 B2 | 3/2005 | Davis et al. | |
| 7,010,363 B2 | 3/2006 | Donnelly et al. | |
| 7,110,832 B2 | 9/2006 | Ghent | |
| 7,266,962 B2 | 9/2007 | Montuoro et al. | |
| 7,489,988 B2 | 2/2009 | Matsui et al. | |
| 8,183,995 B2 | 5/2012 | Wang et al. | |
| 8,914,160 B2 * | 12/2014 | Yang et al. | 700/296 |
| 2001/0010032 A1 | 7/2001 | Ehlers et al. | |
| 2002/0024332 A1 | 2/2002 | Gardner | |
| 2002/0162032 A1 | 10/2002 | Gundersen et al. | |
| 2003/0045969 A1 * | 3/2003 | Matsuo et al. | 700/291 |
| 2003/0055677 A1 * | 3/2003 | Brown | G06Q 30/06 700/291 |
| 2003/0182023 A1 | 9/2003 | Perez | |
| 2003/0233201 A1 | 12/2003 | Horst et al. | |
| 2005/0162273 A1 * | 7/2005 | Yoon et al. | 340/539.14 |
| 2005/0187727 A1 | 8/2005 | Weik et al. | |
| 2006/0064205 A1 | 3/2006 | Ying | |
| 2006/0095164 A1 | 5/2006 | Donnelly et al. | |
| 2007/0005195 A1 | 1/2007 | Pasquale et al. | |
| 2007/0203860 A1 * | 8/2007 | Golden et al. | 705/412 |
| 2007/0220907 A1 | 9/2007 | Ehlers | |
| 2008/0058997 A1 | 3/2008 | Timblin | |
| 2008/0106147 A1 | 5/2008 | Caggiano et al. | |
| 2008/0281473 A1 * | 11/2008 | Pitt | 700/291 |
| 2010/0101254 A1 | 4/2010 | Besore | |
| 2010/0141046 A1 * | 6/2010 | Paik | 307/126 |
| 2010/0141463 A1 * | 6/2010 | Schweitzer, III | G08B 3/10 340/658 |
| 2010/0146712 A1 * | 6/2010 | Finch et al. | 8/137 |
| 2010/0179708 A1 * | 7/2010 | Watson et al. | 700/296 |
| 2011/0022242 A1 * | 1/2011 | Bukhin et al. | 700/291 |
| 2011/0046806 A1 * | 2/2011 | Nagel et al. | 700/291 |
| 2011/0307110 A1 | 12/2011 | Sharma et al. | |
| 2012/0029711 A1 * | 2/2012 | Besore et al. | 700/287 |
| 2012/0109394 A1 | 5/2012 | Takagi et al. | |
| 2012/0166008 A1 | 6/2012 | Jeong | |
| 2012/0209443 A1 * | 8/2012 | Lee | H02J 3/14 700/295 |
| 2013/0253719 A1 * | 9/2013 | Kubota | G06F 1/26 700/291 |
| 2014/0371934 A1 * | 12/2014 | Kubota et al. | 700/291 |
| 2015/0005973 A1 * | 1/2015 | Kinugasa et al. | 700/295 |

* cited by examiner

HOUSEHOLD ENERGY MANAGEMENT SYSTEM

CROSS-REFERENCE

This application is a divisional of co-pending U.S. application Ser. No. 13/042,550, filed Mar. 8, 2011, which is hereby incorporated by reference in its entirety.

BACKGROUND

Many power providers are currently experiencing a shortage of electric generating capacity due to increasing consumer demand for electricity. More specifically, generating plants are often unable to meet peak power demands resulting from electricity demanded by many consumers at the same time. In addition, consumers are looking for was to manage, energy demands to minimize dependence on energy supplied from a utility (i.e. the 'electrical grid').

In order to reduce high peak power demand, many power providers have instituted time of use metering, and rates which include higher rates for energy usage during on-peak times and lower rates for energy usage during off-peak times. As a result, consumers are provided with an incentive to use electricity at off-peak times rather than on-peak times, look, for other 'local' energy sources for supplemental generation of energy, and/or establish a "do not exceed" whole home energy consumption level.

Presently, to take advantage of the lower cost of electricity during off-peak times, a user must manually operate appliances or other electronic devices during the off-peak times. This is undesirable because a consumer may not always be present in the home, or awake, to operate the appliance, during off-peak hours. This is also undesirable because the consumer is required to manually track the current time to determine what hours are off-peak and on-peak. Therefore, there is a need to provide a system that facilitates operating appliances during off-peak hours in order to reduce consumer's electric, bills and to reduce the load on generating plants during on-peak hours. Additionally, there is a need to provide a system that (in combination with the aforementioned) incorporates a method for enlisting the generation of energy at a 'local' source that can be used to supplement or replace energy generation from a utility or electrical grid. A cost and amount of energy generation from the 'local' source can be compared against the cost and amount of energy supplied from a utility, wherein a shifting of demand from one to the other can be initiated based on predetermined criteria.

SUMMARY

In an embodiment of the invention, a household energy management system is provided for managing multiple appliances. The system comprises a controller for managing power consumption of multiple appliances within a household; a utility meter for measuring an amount of energy usage to a household, the utility meter communicating to the controller a demand limit; a user interface through which a user can enter a parameter of energy usage; and a local generator for generating local energy. The capacity of the local generator establishes a supply limit. The management system further comprises a communication network connecting the controller to at least one of the utility meter, the local energy storage device, and a demand server. The controller controls or operates the multiple appliances based on communications from at least one of the utility meter, the user interface, the local generator, the local, storage device, and the demand server, such that the energy usage does not exceed the supply limit of the local generator.

In an embodiment of the invention, a household energy management system for managing multiple appliances is provided. The system comprises a controller for managing power consumption of multiple appliances within a household; a utility meter for measuring an amount of energy usage to a household, the utility meter communicating to the controller a demand limit; and a user interface through which a user can enter a parameter of energy usage. The controller establishes a demand limit. A communication network connects the controller to the utility meter and/or to a demand server. The controller controls or operates the multiple appliances based on communications from at least one of the utility meter, the user interface, and a demand server, such that the energy usage does not exceed the established demand limit.

DETAILED DESCRIPTION

Figure 1:
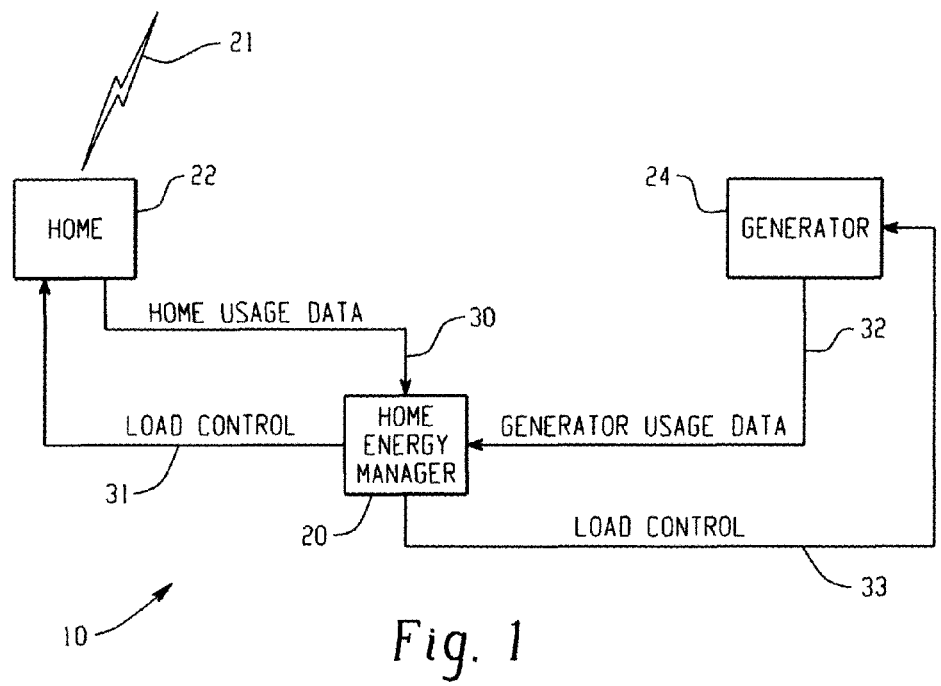
FIG. 1 is a block diagram of a home energy manager.

The present disclosure encompasses an energy management system that may be used with an appliance, and/or a household of appliances, energized by a local energy generator that supplements the energy supplied by the utility, in order to reduce household, electricity costs and also to reduce the load on generating plants during all hours of electricity usage. The energy management system is applicable to, and can be used in conjunction with, any and all types of household appliance(s)/device(s) such as a dryer, a washing machine, a dishwasher, an oven, a refrigerator, HVAC etc.

In one embodiment, the energy management system may include a user interface, a time keeping mechanism, and a mode selecting device. The user interface may be any type of interface such as a touch screen, knobs, sliders, buttons, speech recognition, etc, to allow a user to input a schedule of on-peak times or schedules and off-peak times or schedules for each day of the week. The schedule of on-peak times and off-peak times for a household may typically be obtained from a generating plant or power utility that services the household. The schedule may be obtained from published tables made available to the public or other means such as billing statements. If the schedule of times changes, the user may use the user interface to alter and update the schedule that was previously entered.

The terms on-peak and off-peak, as used herein are meant to encompass time periods that an energy supplier has designated as referring to periods of high energy demand or cost and periods of low energy demand or cost, respectively. It may be that in some situations, multiple levels are designated by the energy supplier and thus on-peak is meant to refer to those periods where the energy demand or cost is greater than some other period, with the other period, being referred to as off-peak. In any given situation, on-peak may not be the highest level of cost or energy demand and off-peak may not be the lowest level of cost or energy demand.

The energy management system can also include a time keeping mechanism (not shown) that provides information to the appliance and user regarding the current time of the day. In one embodiment, the time keeping mechanism also includes a calendar function to provide information regarding the day of the week and the current date. The current time and date may be input or adjusted by the user via controls on the time keeping mechanism.

Utility companies are starting to develop sliding rate scales based upon time of use for power consumption. A home that can manage a response to a different rate schedule will have an advantage in the marketplace. A time of day (TOD) import to the appliances will allow the unit to run at times, on more occasions, and/or during more periods when utility rates are low or off-peak. The time of day input can be manually entered or automatically received by the appliances (an example of automatic updating would be using a radio wave or radio clock to sync to an atomic clock signal). The time of day feature or off-peak manager can effectively save the consumer money by running the appliances according to a pre-determined schedule, i.e. predominantly, when the rates are lower. Additionally, a home that can maintain a predetermined and consistent energy demand on the utility will also have an advantage in the marketplace. In this manner, the home can maintain a "do not exceed" energy demand level which results in a predetermined demand on the utility that does not contribute to the peak demand periods. To be described in more detail hereinafter, the energy management system can also provide a local energy source to substitute, apportion, or supplement energy generation for whole home consumption.

In addition to the aforementioned, the mode selecting device allows the user to select an energy management mode. The mode selecting device may be a single button such that the energy management mode is selected when the button is depressed. Alternatively, the mode selecting device may also be two separate buttons, a switch, a touch panel, or any other type of device that allows for selection of the energy management mode. Although the control panel, the user interface, the time keeping mechanism and the mode selecting device (not illustrated) can be four separate elements, each of these elements, or any combination thereof, may alternatively be incorporated into a single interface or display to provide for ease of use.

The present disclosure utilizes a series of algorithms in a home energy manager or controller 20 to control and adjust home energy demand in order to keep the total home energy consumption below a user defined value. It is to be appreciated that the user defined value can correspond to the energy supply capacity of a local energy source (i.e. resident generator, solar, wind, et al.) or can correspond to a predetermined limit value. In this manner, the algorithm may enable the appliances to only consume what is being generated from the local energy source so as to eliminate or minimize the energy demand on the utility. Alternatively, the demand on the utility can be controlled or maintained, within certain predefined levels.

The present disclosure provides a system and method for coordinating a suite of demand response appliances that are capable of responding to incoming signals that calls for a "load shedding or load control" event. In addition to the appliances that are demand response ready, the home energy manager system can provide feedback to the user regarding the performance of the appliances through home usage data. The user will be able to monitor and/or modify the appliance responses as well as get real time feedback as to the energy consumption of the appliances. For electrical devices, the system controller is configured to characterize the power consumption of the appliances at any given point using appliance data from current transducers, shunts, meter pinging, or lookup tables.

Referring to FIG. 1, the present disclosure provides a system 10 and method of providing information to the system controller, (HEM) 20 from a local energy generator (via generator usage data 32) wherein the HEM 20 can control (i.e. load control 33) the generator to optimize the overall energy usage. The generator 24 can be used in several ways to optimize the energy usage within a home 22. For example, the generator 24 can be automatically started and the home 22 can be taken of the utility grid using switch circuits. For example, a switch circuit can be used as an isolation circuit in order to isolate the energy demand to the local energy generator during specific grid loading or price points, or for a majority of the time. In another embodiment, a method is provided for managing energy usage of a plurality of appliances wherein managing energy can include managing the energy consumption of the plurality of appliances in order to not exceed the capacity of the local energy generator 24 (i.e. load control the appliances 31). The method can comprise receiving an energy output supply level and scheduling and/or load shaving the plurality of appliances such that the demand does not exceed the energy output supply level.

As described above, the control algorithm allows the HEM 20 to adjust appliance and non-smart appliance associated electrical outlet load behavior in order to keep the total home energy consumption below a user defined value. This feature can be used in conjunction with, for example, a home solar or wind generation system so that the home only consumes what is being generated from the solar/wind system and thus, is not purchasing electricity from the utility (i.e. grid).

In addition to the above, control of the total home energy consumption can also be applied to those home energy management systems that receive demand response (pricing and load control) events from a utility 21. The HEM can manage the whole home consumption to a user defined or "do not exceed" value for each demand response event.

Figure 2:
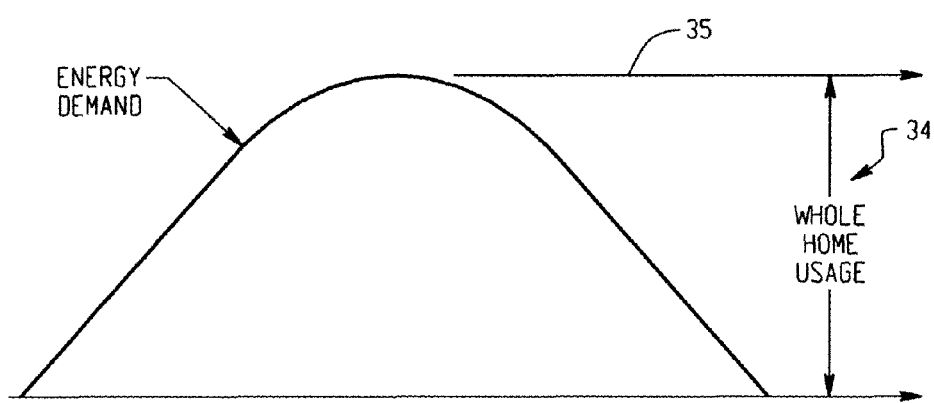
FIG. 2 is a diagram displaying energy demand wherein a whole home consumption can be maintained at or below a specified value.

The HEM 20 can communicate wirelessly with a smart meter or other ESI (Energy Services Interface), all networked appliances, and programmable load switches (a 120V or 240V outlet that contains line interrupt switch(es) that can be turned on or off by means of a wireless signal). The HEM 20 receives current power consumption information from each of these networked devices and thus can calculate the entire home's energy consumption 34 as well as the breakdown by appliance/load (FIG. 2).

Within the graphical user interface (GUI) of the HEM, exists an option screen for managing to a peak load (not shown). This screen contains a field for entering the max kW value, i.e. 'do not exceed' energy demand or limit value 35, to keep the home's energy demand at or below said value 35. Below that field exists a list of all networked devices were the homeowner can set a hierarchy for the order in which the HEM is to disable, suspend, or reduce the devices' functions (these options are based on appliance/load). The user can also disable this option for a particular networked device.

Once the load limiting or demand response mode is enabled, the HEM will then monitor the home consumption and adjust the network devices (per the hierarchy list) in order to keep the home under the "do not exceed" value. A communication network can connect the controller to one or more of the utility meter, a local energy storage device (i.e. battery storage device), the local energy generator, and/or a demand server. The controller controls or operates the multiple appliances based on communications from one or more of the utility meter, the user interface, the local energy generator, the local energy storage device and/or the demand server such that the energy usage does not exceed the supply limit of the local generator.

An example of a load limiting algorithm is described below. The user can set the maximum kW value (i.e. a 'do not exceed' total energy demand) to 4 kW (for example). One exemplary hierarchy table can be set as follows: first—dryer; second—refrigerator; third—pool pump; fourth—washer; fifth—dishwasher; sixth—basement electrical outlet; do not modify—range; and, do not modify—living room electrical outlet. If and when the home begins to consume more than 4 kW of total energy, the HEM will first pause the dryer and then perform a check on the total energy demand. If the energy demand is still above the maximum kW value, the HEM will step down through the list of loads as follows: secondly set back the refrigerator setpoints; thirdly stop the pool pump; fourthly pause the washer; etc., until the home's total kW energy demand is below 4 kW. Once the energy demand drops back below 4 kW (with a certain amount of margin), the HEM can begin to re-enable each of the devices on the hierarchy list.

Energy consumption rates can be monitored on a real time basis to determine the load on the local energy generator or utility. The HEM system can make suggestions as to which loads to curtail, per the hierarchy, and then recalculate the consumption rates based on the new and modified load. The HEM can present the user with information showing the consumption rates and the prioritization of the devices in the order of the established hierarchy. The system can continually and automatically control loads 31, 33 to prevent exceeding the energy demands on the local, energy generator or utility using a priority curtailment scheme. Likewise, the system 10 could predict when the energy demand will exceed the local energy generator supply output. The system 10 can provide this information to the user which would then allow the user to modify the load control 33 to conserve energy and make suggestions to the user to modify or curtail appliance loads to minimize the energy demands. Either the HEM or a smart appliance could look at commands to other devices and respond to those.

The aforementioned algorithm takes the low-level details of home energy management out of the consumer's hands. If the consumer wants to only run their home off a generation system (such as solar or wind) this algorithm will manage loads ensuring the entire house is run off the generation source instead of purchasing electricity from the utility. This in to saves the consumer money and also helps reduce the peak load on the electrical grid.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A household energy management system for managing multiple appliances, comprising:
    a controller configured to manage power consumption of multiple appliances within a household;
    a utility meter configured to measure an amount of energy usage to a household, the utility meter communicating to the controller a demand limit;
    a user interface through which a user can enter a parameter of energy usage;
    a local generator configured to generate local energy, wherein a supply limit is established based upon the capacity of the local generator, and wherein the supply limit is a maximum power level;
    a communication network which connects the controller to at least one of: the utility meter, a local energy storage device, the local generator, and a demand server;
    the controller configured to operate the multiple appliances based on communications from at least one of: the utility meter, the user interface, the local generator, the local energy storage device and the demand server, such that the energy usage does not exceed the supply limit of the local generator,
    the controller configured to predict when an energy demand rate from the multiple appliances will exceed the local generator supply limit and to communicate the prediction to a user, and
    the controller further configured to make suggestions of possible modifications to the operation of the multiple appliances to reduce the energy demand rate to below the local generator supply limit, the suggestions including suggestions as to which appliance to curtail, and to then calculate and present to the user consumption rates based on the modifications.

2. The household energy management system of claim 1, wherein the controller allocates energy to the multiple appliances and makes suggestions of possible modifications based on at least one of the following: the demand limit, a prioritization of each of the one or more appliances, an energy need level of each of the multiple appliances, and the supply limit.

3. The household energy management system of claim 1, wherein the controller instructs one or more appliances to shed load on demand.

4. The household energy management system of claim 3, wherein the one or more appliances includes at least one of: household lighting, a refrigerator, a washer, a dryer, a stove, an oven/range, a microwave oven, a dishwasher, an HVAC system, a hot water heater, and an electrical outlet load.

5. The household energy management system of claim 1, wherein the local generator is selected from the group consisting of a wind powered generator, a solar powered generator, a water powered generator, and fuel powered generator.

6. A household energy management system managing multiple appliances, comprising:
    a controller configured to manage power consumption of multiple appliances within a household;
    a utility meter configured to measure an amount of energy usage of a household, the utility meter communicating to the controller a demand limit;
    a user interface through which a user can enter a parameter of energy usage,
    wherein the controller establishes a demand limit;
    a communication network which connects the controller to the utility meter and/or to a demand server;
    the controller configured to control the multiple appliances based on communications from at least one of: the utility meter, the user interface, and the demand server, such that the energy usage does not exceed the established demand limit;
    the controller configured to predict when an energy demand rate from the multiple appliances will exceed a local generator supply limit and to communicate the prediction to a user, wherein the supply limit is a maximum power level, and
    the controller further configured to make suggestions of possible modifications to the operation of the multiple appliances to reduce the energy demand rate to below the local generator supply limit, the suggestions including suggestions as to which appliance to curtail, and to then calculate and present to the user consumption rates based on the modifications.

7. The household energy management system and method of claim 6, wherein the controller allocates energy to the multiple appliances and makes suggestions of possible modifications based on at least one of the following: the demand limit, a prioritization of each of the one or more appliances, an energy need level of each of the multiple appliances, and a hierarchy of energy demand load shedding.

8. The household energy management system of claim 6, wherein the controller instructs one or more appliances to shed load on demand.

9. The household energy management system of claim 8, wherein the one or more appliances includes at least one of: household lighting, a refrigerator, a washer, a dryer, a stove, an oven/range, a microwave oven, a dishwasher, an HVAC system, a hot water heater, and an electrical outlet load.

* * * * *